Patented Apr. 11, 1933

1,903,466

UNITED STATES PATENT OFFICE

HYMAN LIMBURG, OF AMSTERDAM, NETHERLANDS, ASSIGNOR, BY MESNE ASSIGNMENTS, TO THE FLINTKOTE CORPORATION, OF BOSTON, MASSACHUSETTS, A CORPORATION OF MASSACHUSETTS

PROCESS OF PURIFYING SULPHONIC ACIDS

No Drawing. Application filed October 18, 1928, Serial No. 313,385, and in the Netherlands November 11, 1927.

This invention relates to processes for the purification of sulphonic acids, such for example, as those obtained by sulphonating mineral oil, mineral oil fractions and similar organic substances.

In the manufacture of sulphonic acids by acting on organic compounds with sulphuric acid or oleum, the sulphonated products obtained including those which are oil insoluble and which are separated with the acid sludge as well as those which are soluble in the material treated contain sulphuric or sulphurous acid. In other processes for the production of the said sulphonic acids reaction products are obtained which contain other inorganic acids or salts.

When treating mineral oil including such as contain naphthenic acids with sulphuric acid and subsequently treating the naphthenic acid containing oil with an aqueous or alcoholic lye, the oil soluble sulphonic acids and/or naphthenic acids are obtained as soaps that contain sulphate or sulphite of alkali.

In both cases the presence of inorganic acids and salts in said sulphonic or naphthenic acids is objectionable to their use for various purposes.

When using the sulphonic acids as an emulsifying agent for example for so-called soluble oil, the inorganic salts, e. g. sulphate of sodium, usually crystallize out after some time and thereby choke pumplines, etc. Another example of the undesirability of the said salts is in the use of the acids as an emulgator for asphalt and the like, in which case the salts act as flocculating agents and thus render the acids unsuitable for use as emulsifying agents.

According to my invention the said acids, which cannot be purified by washing with water because they are inclined to form colloidal solutions and thus prevent a separation between the watersoluble impurities and the colloidal watersoluble acids are mixed with water, subsequently adding to the mixture so much of a suitable volatile electrolyte as to cause flocculation of the acids either as such or in the form of salts. By a volatile electrolyte I mean in this case an electrolyte the boiling point of which differs sufficiently from the boiling point of the substances to be purified so as to permit a simple mode of separation by means of distillation. As such I may employ for example hydrochloric acid, nitric acid, acetic acid, ammonia and the like. The nature of the electrolyte or precipitating means should be such as to dissolve in aqueous solution the impurities which it is desired to remove.

The impurities will then remain in the aqueous liquid and may be removed together with this liquid. If desired the process may be repeated until the desired degree of purification is reached.

I have further found that the quantity of precipitating means may be considerably diminished by adding to the substances which it is desired to purify a liquid which is not or hardly soluble in water for example benzene, mineral oil fractions and the like. The products obtained in this way contain water, the volatile precipitating means and the substance if any mentioned in the preceding sentence. These substances may be removed by heating the mixture if desired whilst leading air or some other gas through it. In case the sulphonic acid and the like do not endure heating without decomposition, vacuum may be applied in order to remove the volatile components.

In some cases a suitable solvent, such as mineral oil and the like may be added in order to facilitate distillation.

Example I 1000 kilograms of a mineral lubricating oil distillate which after treatment with 100 kilograms of concentrated sulphonic acid and removal of the acid sludge contains about 1.5% oil soluble sulphonic acids and a quantity of naphthenic acids is neutralized with 60 kilograms of an alkali lye of 20° Bé. After removal of the aqueous lye the sulphonic and naphthenic soaps are extracted by means of shaking with alcohol of 50%. Besides the soaps also the impurities such as NaOH, $Na_2SO_4$, $Na_2SO_3$, pass into the alcohol. From this alcoholic solution the alcohol is removed by distillation and to the so obtained aqueous soap solution 25 kilograms benzene and 100 kilograms of water are added. The benzene forms thereby a more or less stable aqueous emulsion. Ammonia is now added in order to flocculate the soaps together with benzene. After removal of the salt containing aqueous liquid the soaps are separated from the water, ammonia and benzene by distillation.

*Example II*

Acid sludge obtained by treating mineral lubricating oil with an excess of oleum is diluted with 25 percent by volume of water which causes the separating out of the sulphonic acids and the like. 1000 kilograms of these acids are dissolved in 2000 kilograms of water and subsequently precipitated from this solution by means of hydrochloric acid. The sulphonic acids are separated from the aqueous liquid for example by filtration and again subjected to the described purifying process. Finally the water and hydrochloric acid are removed by distillation.

Some of the products so obtained are excellent emulsifying and stabilizing agents especially for the manufacture of asphalt emulsions whilst others may be used for the manufacture of so-called soluble oil.

They are also useful for deemulsifying emulsions in which water forms the inner phase and non-aqueous substances form the outer phase, for example petroleum emulsions and the like.

What I claim is:

1. In a process for the purification of oil soluble sulphonic acids containing inorganic impurities the steps which comprise treating the material to be purified to convert the sulphonic acids into soaps, mixing the soap with water, treating the mixture with a volatile distillable basic substance to flocculate the soaps, removing the aqueous liquid containing said impurities and freeing the product of said volatile substance.

2. In a process for the purification of oil soluble sulphonic acids containing inorganic impurities the steps which comprise treating the material to be purified to convert the sulphonic acids into soaps, mixing the soap with water, treating the mixture with a volatile electrolyte, capable of flocculating the soaps, removing the aqueous liquid containing said impurities and freeing the product of said volatile electrolyte.

3. In a process for the purification of oil soluble sulphonic acids containing inorganic impurities the steps which comprise treating the material to be purified to convert the sulphonic acids into soaps, mixing the soap with water, treating the mixture with ammonia, removing the aqueous liquid containing said impurities and freeing the product of said ammonia.

4. In a process for the purification of oil soluble sulphonic acids containing inorganic impurities the steps which comprise treating the material to be purified to convert the sulphonic acids into soaps, mixing the soap with a water immiscible liquid and with water, treating the mixture with a volatile distillable basic substance to flocculate the soaps, removing the aqueous liquid containing said impurities and freeing the product of said volatile substance and said water immiscible material.

5. In a process for the purification of oil soluble sulphonic acids containing inorganic impurities the steps which comprise treating the material to be purified to convert the sulphonic acids into soaps, mixing the soap with a water immiscible liquid and with water, treating the mixture with a volatile electrolyte capable of flocculating the soaps, removing the aqueous liquid containing said impurities and freeing the product of said volatile electrolyte and said water immiscible material.

6. In a process for the purification of oil soluble sulphonic acids containing inorganic impurities the steps which comprise treating the material to be purified to convert the sulphonic acids into soaps, mixing the soap with benzene and water, treating the mixture with a volatile distillable basic substance to flocculate the soaps, removing the aqueous liquid containing said impurities and freeing the product of said volatile substance and benzene.

7. A process for the recovery and purification of oil soluble sulphonic acids containing inorganic impurities which comprises, neutralizing the oil containing the sulphonic acids with an aqueous alkali, separating the aqueous solution containing sulphonic acid soaps and impurities from the oil, treating the aqueous solution so obtained with an aqueous alcohol solution, removing the alcohol from the extract by distillation, treating the remaining soaps with benzene and ammonia to flocculate the soaps, and removing the water, ammonia and benzene present by distillation.

8. The method of recovering and purifying water soluble sulphonic acids which comprises extracting soaps of said acids from an aqueous medium by means of an aqueous alcohol solution, separating the alcohol from the aqueous solution of soaps, treating the separated soaps with a distillable electrolyte to flocculate the soaps, removing the aqueous liquid containing impurities and freeing the product from the electrolyte by distillation.

In testimony whereof I have affixed hereunto my signature.

HYMAN LIMBURG.